J. W. Milroy,
Tile Machine.
N° 71,040        Patented Nov. 19, 1867.
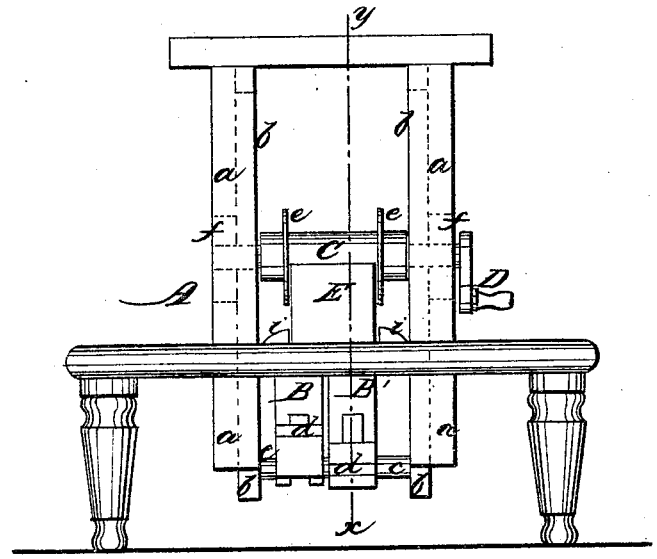
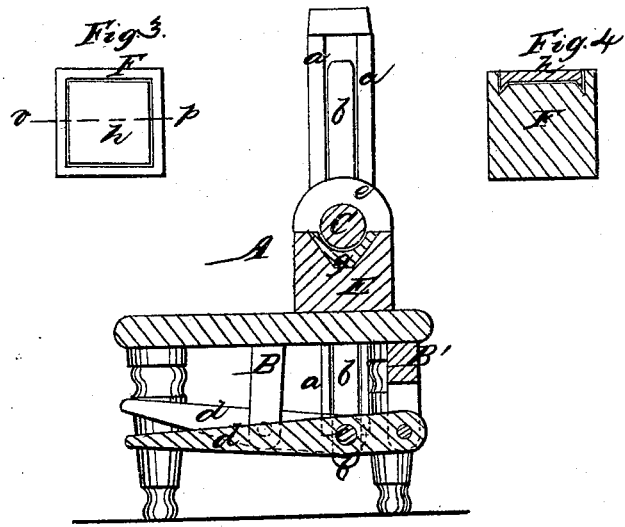
Witnesses                    Inventor
Jesse Jeff                   James W. Milroy Jr.
James R. Fitch               his Attorney G. B. Towle

United States Patent Office.

JAMES W. MILROY, OF GALVESTON, INDIANA.

Letters Patent No. 71,040, dated November 19, 1867.

---

IMPROVED DRAIN-TILE MACHINE.

---

The Schedule referred to in these Letters Patent and making part of the same.

---

TO ALL WHOM IT MAY CONCERN:

Be it known that I, JAMES W. MILROY, of Galveston, in the county of Cass, and State of Indiana, have invented a new and useful Improvement in Drain-Tile Machines; and I do hereby declare that the following is a full, clear, and exact description of the construction and operation of the same, reference being had to the accompanying drawings, making a part of this specification, in which—

Figure 1 is a front view of the machine.

Figure 2 a vertical transverse section, as indicated by the line $x\ y$ of fig. 1.

Like letters in both figures of the drawings indicate like parts.

The nature of my invention consists in the construction of a machine for moulding tiles for drains, by means of a table and treadles operating a roller through slides working in grooved standards, said roller forming the tile by means of a mould arranged in combination therewith.

To enable any one skilled in the art to make and use my invention, I will proceed to describe its construction and operation.

A represents the machine. It consists of a table supported on legs, and with two standards, $a\ a$, attached thereto, which extend a suitable distance below and above the table, and secured at the top by a cross-piece. In the standards are grooves, in which are placed slides $b\ b$. Attached to the lower end of the slides, under the table, is a shaft, $c$. The shaft $c$ extends through two treadles, $d\ d$. The end of the one to the right in fig. 1 is affixed to a pivot in an open-slotted short standard, B', in the rear of the shaft. The centre of the other, or thereabouts, to the left, is affixed to a pivot in a like standard, B, in the front of the shaft. Above the table, and attached to the slides, is a pressure-roller, C, provided with circular knives, $e\ e$. The ends of the roller are made to fit loosely but snugly in elongated slots, $f\ f$, in the standards, (see same in dotted lines in fig. 1,) so that the roller may be revolved by the handle D, or moved up and down in the slots by the treadles. E is a mould, represented on the table under the roller.

Operation: The mould being properly filled with mortar or clay, the roller is raised by the left treadle, and the mould slid under it between cleats $i\ i$ on the table. The roller is then brought down by the right treadle and the tile thus formed, (see fig. 2.) While down, the roller is turned around by the crank-handle, to loosen it from the tile, as well as to smooth it on the inside, the circular knives cleaning and smoothing the ends of the tile. The roller is then raised by the left treadle, the mould pulled back, and a cutter drawn over the top of the mould to smooth off the upper edges of the tile. The tiles thus made are then properly dried and burned for use in drains.

Having thus fully described my invention, what I claim therein as new, and desire to secure by Letters Patent, is—

The construction of a machine for moulding tiles for drains by means of a table and treadles, $d\ d$, operating the roller C through slides $b\ b$ working in grooved standards $a\ a$, and the combination of the mould E with the roller in a machine as thus constructed, substantially in the manner and for the purpose as herein set forth.

JAMES W. MILROY.

Witnesses:
  WILLIAM R. LAMB,
  THORNBURG BALDWIN.